US009263081B2

(12) United States Patent
Wada et al.

(10) Patent No.: US 9,263,081 B2
(45) Date of Patent: Feb. 16, 2016

(54) OPTICAL PICKUP DEVICE

(71) Applicant: ALPINE ELECTRONICS, INC., Shinagawa-ku, Tokyo (JP)

(72) Inventors: Mitsunori Wada, Iwaki (JP); Katsunari Ashimine, Iwaki (JP); Yasunobu Inaba, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 14/697,922

(22) Filed: Apr. 28, 2015

(65) Prior Publication Data
US 2016/0019925 A1    Jan. 21, 2016

(30) Foreign Application Priority Data

Jul. 16, 2014  (JP) ................. 2014-145629

(51) Int. Cl.
| | | |
|---|---|---|
| G11B 20/10 | (2006.01) | |
| G11B 7/1374 | (2012.01) | |
| G11B 7/085 | (2006.01) | |
| G11B 7/09 | (2006.01) | |
| G11B 7/095 | (2006.01) | |

(52) U.S. Cl.
CPC .......... *G11B 7/1374* (2013.01); *G11B 7/08582* (2013.01); *G11B 7/0932* (2013.01); *G11B 7/0935* (2013.01); *G11B 7/0956* (2013.01)

(58) Field of Classification Search
CPC ............. G11B 7/08582; G11B 7/0927; G11B 7/0929; G11B 7/0932; G11B 7/0933; G11B 7/0935; G11B 7/0956; G11B 7/121
See application file for complete search history.

(56) References Cited

U.S. PATENT DOCUMENTS

| | | | | |
|---|---|---|---|---|
| 7,929,385 B2* | 4/2011 | Fujiwara | ............. | G11B 7/0937 369/44.15 |
| 2001/0055265 A1 | 12/2001 | Obara | | |
| 2007/0171777 A1* | 7/2007 | Takahashi | ............. | G11B 7/0935 369/44.15 |
| 2008/0037383 A1* | 2/2008 | Suzuki | .................. | G11B 7/121 369/44.14 |
| 2008/0077946 A1* | 3/2008 | Suetsugu | ................. | G11B 7/22 720/600 |

FOREIGN PATENT DOCUMENTS

JP    2001-319342    11/2001

* cited by examiner

*Primary Examiner* — Dionne H Pendleton
(74) *Attorney, Agent, or Firm* — Brinks Gilson & Lione

(57) ABSTRACT

An optical pickup device is one in which a lens holder is held by a movable base by using a resilient wire. A restricting abutting portion is formed at a lower portion of the lens holder. When the lens holder moves excessively downward, the restricting abutting portion comes into contact with a stopper portion to restrict a downward movement of the lens holder, so that it is possible to prevent the lens holder from contacting a unit chassis. When the unit chassis is not mounted on the movable base, it is possible to prevent excessive flexing of the resilient wire caused when an opposing abutting portion of the lens holder comes into contact with the unit chassis.

16 Claims, 4 Drawing Sheets

OPTICAL PICKUP DEVICE

RELATED APPLICATION

The present application claims priority to Japanese Patent Application Number 2014-145629, filed Jul. 16, 2014, the entirety of which is hereby incorporated by reference.

BACKGROUND

1. Field of the Invention

The present disclosure relates to an optical pickup device having a structure in which a lens driving unit is mounted on a movable base, the lens driving unit including, for example, a lens holder and a focus correcting mechanism.

2. Description of the Related Art

An optical pickup device that reproduces information from various types of recording media, such as CDs or DVDs, includes a movable base that moves along a recording surface of a disk, with a lens driving unit being mounted on the movable base. The lens driving unit is provided with a unit chassis. A tilt adjusting mechanism that adjusts the tilt of the lens driving unit is provided between the unit chassis and the movable base.

In the lens driving unit, mounted at the unit chassis are a lens holder that holds an objective lens opposing a disk, a resilient supporting member that movably supports the lens holder, a focus correcting mechanism that moves the lens holder in a direction of an optical axis of the objective lens, and a tracking correcting mechanism that moves the lens holder in a radial direction that is orthogonal to the optical axis.

In an optical pickup device described in Japanese Unexamined Patent Application Publication No. 2001-319342 (Patent Literature (PTL) 1), four resilient wires that extend in a direction that is orthogonal to an optical axis of an objective lens are used as resilient supporting members. Base portions of the resilient wires are secured at a base member corresponding to a unit chassis. A lens holder is secured to end portions of the resilient wires. In this structure, by resiliently flexing the resilient wires, the lens holder is movable in a focus correction direction and a tracking correction direction.

The optical pickup device described in PTL 1 includes a stopper at a bottom portion of an optical chassis corresponding to the movable base. The stopper opposes a bottom portion of the lens holder through a through-hole formed in the base member. When the lens holder moves by a large amount in a direction opposite to a disk, the bottom portion of the lens holder passes through the through-hole and comes into contact with the stopper, to allow the amount of movement of the lens holder to be restricted.

Since the optical pickup device described in PTL 1 has a structure in which only the optical chassis opposes a lower portion of the lens holder, the optical pickup device can be made thin.

The optical pickup device described in PTL 1 has a structure in which the bottom portion of the lens holder and the stopper of the optical chassis come into contact with each other via the through-hole formed in the base member. Therefore, in a step that is executed after, for example, the resilient wires, the lens holder, and the focus correcting mechanism have been mounted on the base member and before the base member is mounted at the optical chassis, if an external force accidentally acts upon the lens holder, the resilient wires may become excessively bent due to the movement of the lens holder to a position where it passes the inside of the through-hole. If the flexing amount of the resilient wires at this time goes beyond a resilience region and exceeds a yield point, the resilient wires undergo plastic deformation and become defective wires that are incapable of functioning.

In contrast, if the aforementioned through-hole is not provided and a portion of the lens holder is caused to contact the base member when the lens holder is pushed by an external force, it is possible to prevent the resilient wires from flexing by an abnormally large amount. However, the use of such a structure gives rise to new problems such as those described below.

When the lens holder is to be mounted at the base member, it is desirable that the lens holder be secured to the resilient wires after an optical axis center of the objective lens held by the lens holder has been positioned with respect to the base member using an adjusting jig with the base portions of the resilient wires being secured at the base member first. Since the resilient wires are also used as energization paths to coils provided at the lens holder, in general, ordinarily the resilient wires and metallic terminals, which are mounted in the lens holder, are soldered to each other, and the resilient wires and the lens holder are secured to each other by the adhesive force of the solder.

Here, if, during the soldering, flux adheres to a surface of the base member, when a completed optical pickup device is used in a high-temperature environment, the flux is heated and becomes adhesive, as a result of which the lens holder tends to adhere to the surface of the base member by the flux.

In this type of optical pickup device, when a new disk has been loaded, while the focus correcting mechanism moves the lens holder by a large amount in a direction away from the disk and, from this position, moves the lens holder towards the disk, the objective lens causes detection light to converge on a recording surface of the disk and return light thereof is detected, so that, for example, detection of the presence or absence of the disk or detection of the disk type, such as a CD or DVD, is performed. During this operation, if the lens holder even temporarily adheres to the base member, an error occurs in the aforementioned detections. This causes an erroneous determination that the disk does not exist or malfunctions, such as a discharge of the disk to the outside of the optical pickup device without identifying the disk type.

In order to prevent the adhesion of flux to the base member, a method for mounting the resilient wires at the base member after soldering the resilient wires to the lens holder may be considered. However, when the resilient wires that are secured to the lens holder are to be mounted at the base member, it is difficult to position with high precision the optical axis of the objective lens held by the lens holder with respect to the base member.

SUMMARY

Accordingly, it is an object of the present disclosure to provide an optical pickup device that does not allow a lens holder to adhere to a unit chassis even if flux or the like adheres to the unit chassis and that is capable of preventing a resilient supporting member from being excessively deformed in any step.

According to the present disclosure, there is provided an optical pickup device including a movable base and a lens driving unit that is supported by the movable base. The lens driving unit includes a unit chassis, a lens holder, a resilient supporting member, and a focus correcting mechanism. The lens holder, the resilient supporting member, and the focus correcting mechanism are provided at the unit chassis. The lens holder holds an objective lens that opposes a recording medium. The resilient supporting member supports the lens holder. The focus correcting mechanism moves the lens holder in a direction of an optical axis of the objective lens. The lens holder includes a restricting abutting portion and an opposing abutting portion. When the lens holder moves in a direction away from the recording medium, the restricting abutting portion comes into contact with the movable base to restrict further movement of the lens holder. When the lens holder moves in the direction away from the recording medium, the opposing abutting portion moves closer to the unit chassis, and, when the restricting abutting portion comes into contact with the movable base, the opposing abutting portion opposes the unit chassis with a gap between the opposing abutting portion and the unit chassis.

In the optical pickup device according to the present disclosure, it is desirable that a positional relationship between the opposing abutting portion and the unit chassis be determined such that, when the opposing abutting portion and the unit chassis come into contact with each other in a state in which the lens driving unit is not mounted on the movable base, an amount of deformation of the resilient supporting member is within a resilience region of the resilient supporting member.

In the optical pickup device according to the present disclosure, it is desirable that a plurality of the resilient supporting members be provided, the plurality of resilient supporting members be a plurality of resilient wires that extend in a direction that crosses the direction of the optical axis, a base portion of each resilient wire be secured at the unit chassis, and an end portion of each resilient wire and the lens holder be soldered and secured to each other.

The optical pickup device is effective such that, in a state in which the base portion of each resilient wire is secured at the unit chassis, the lens holder is positioned at the unit chassis, and the end portion of each resilient wire and the lens holder are soldered to each other.

In the optical pickup device according to the present disclosure, it is desirable that the movable base include a stopper protrusion that comes into contact with the restricting abutting portion, the unit chassis include a receiving portion that opposes the opposing abutting portion, and an end portion of the stopper protrusion be positioned closer to the lens holder than the receiving portion.

The optical pickup device according to the present disclosure may further include a tilt adjusting mechanism that is disposed between the movable base and the unit chassis, the tilt adjusting mechanism adjusting an amount of tilt of the optical axis of the objective lens.

According to the optical pickup device of the present disclosure, the opposing abutting portion of the lens holder opposes the unit chassis in a state in which the lens holder and the resilient supporting member are mounted at the unit chassis. Therefore, even if a large external force acts upon the lens holder during the time until the lens holder is mounted on the movable base, excessive deformation of the resilient supporting member caused by contact of the opposing abutting portion with the unit chassis can be prevented from occurring.

Next, if the focus correcting mechanism moves the lens holder in a direction opposite to a recording medium when the lens driving unit has been mounted on the movable base, the amount of movement of the lens holder can be restricted by causing the restricting abutting portion of the lens holder to contact the movable base. At this time, even if the restricting abutting portion contacts the movable base, the opposing abutting portion of the lens holder does not contact the unit chassis. Therefore, even if flux used for solder adheres to the lens holder, the problem that the lens holder adheres to the unit chassis in a high-temperature environment no longer occurs.

DESCRIPTION OF THE PREFERRED EMBODIMENTS

Figure 1:
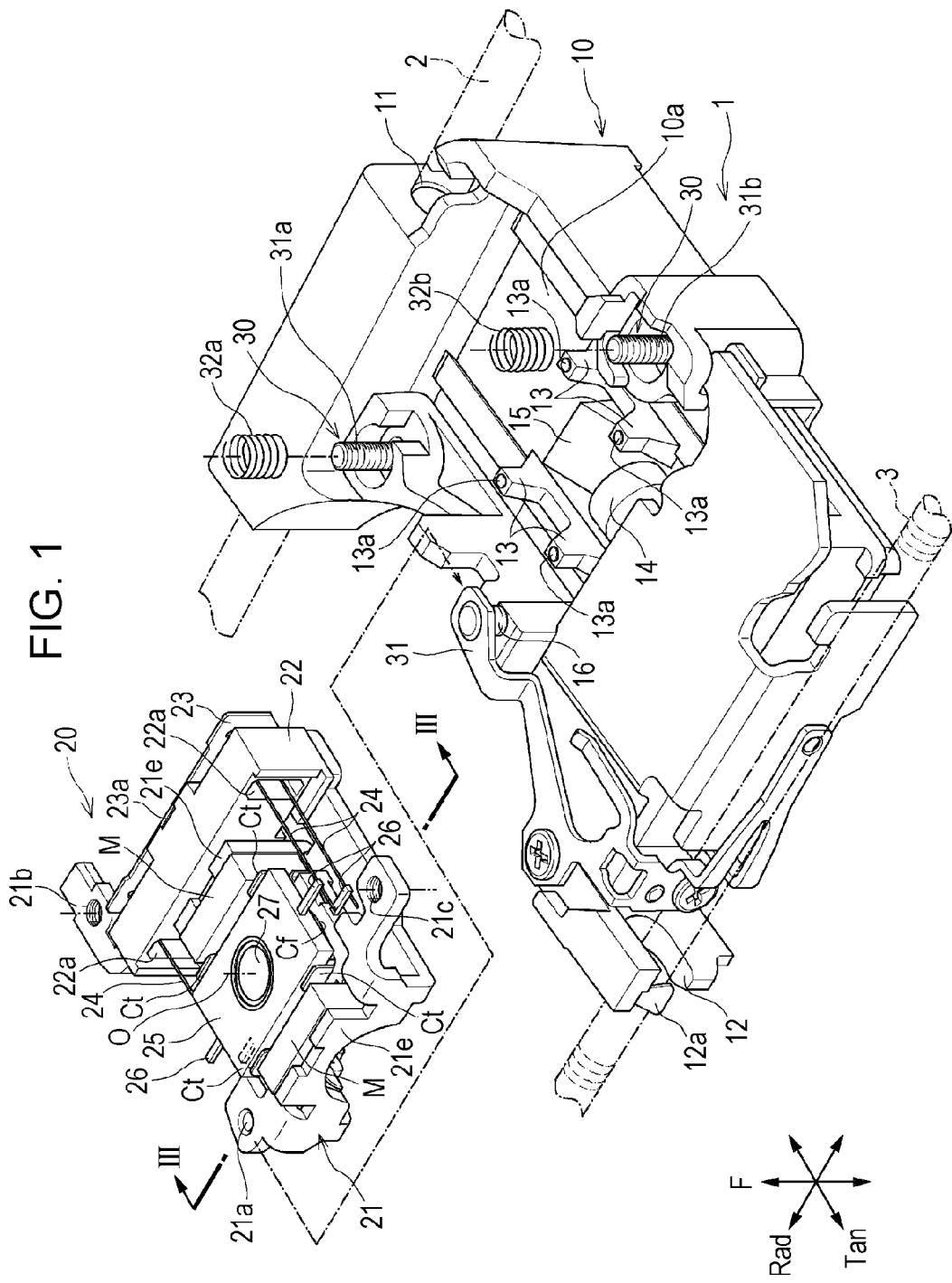
FIG. 1 is an exploded perspective view of an optical pickup device according to an embodiment of the present invention.

An optical pickup device 1 according to an embodiment of the present invention shown in FIG. 1 is mounted on an optical disk device. The optical disk device includes a turntable. Various types of optical disks (recording media), such as a CD or a DVD, are placed on the turntable and rotationally driven. The optical pickup device 1 reproduces information recorded on a recording surface of an optical disk or writes information to the recording surface.

The optical pickup device 1 shown in FIG. 1 includes a movable base 10. The movable base 10 is formed by injection molding with, for example, polyphenylene sulfide (PPS) resin or by die casting with a lightweight metal material, such as aluminum. A reference bearing 11 and a driving bearing 12 are formed in the movable base 10. At the optical disk device, a guide shaft 2 and a drive screw shaft 3 extend parallel to each other. The reference bearing 11 is slidably inserted onto the guide shaft 2. An engaging portion 12a of the drive bearing 12 engages with a screw groove of the drive screw shaft 3. When the drive screw shaft 3 is rotationally driven by a thread motor (not shown), the movable base 10 of the optical pickup device 1 moves in a radial direction (Rad) of an optical disk D.

Stopper protrusions 13 protrude upward (in a direction F, which is a focusing direction) integrally from a bottom portion 10a of the movable base 10. Upper end portions of the stopper protrusions 13 are stopper portions 13a. The stopper portions 13a are provided at four locations.

The movable base 10 functions as an optical base. Various optical components, such as a collimator lens 14 and a prism 15, are mounted on the movable base 10. A light emitting element and a light receiving element are provided on an optical axis of the collimator lens 14.

Figure 3:
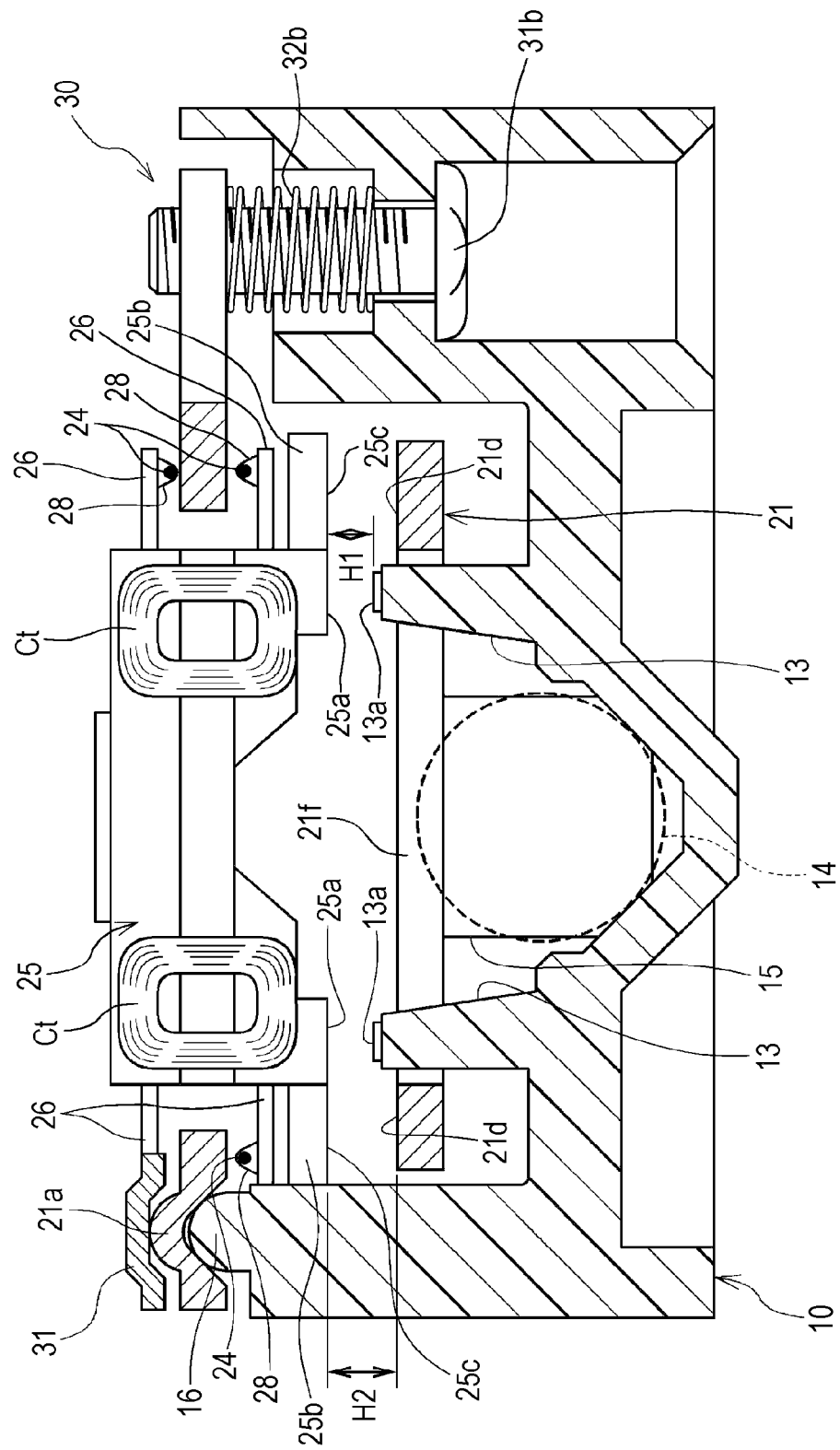
FIG. 3 is a sectional view of the optical pickup device along line III-III and illustrates a state in which the lens holder is in a neutral position.

A lens driving unit 20 is mounted on the movable base 10. The lens driving unit 20 includes a unit chassis 21. The unit chassis 21 is formed of a metal plate. The unit chassis 21 is provided with a support reference portion 21a and a pair of adjustment internally threaded holes 21b and 21c. A fulcrum supporting portion 16 that faces upward is formed at the movable base 10. As shown in FIG. 3, when the lens driving unit 20 is set on the movable base 10, the support reference portion 21a of the unit chassis 21 is set on the fulcrum supporting portion 16, and the support reference portion 21a is pushed against the fulcrum supporting portion 16 by a leaf spring 31 secured to the movable base 10.

A tilt adjusting mechanism 30 is provided between the movable base 10 and the unit chassis 21. In the tilt adjusting mechanism 30, two adjustment screws 31a and 31b are inserted in the movable base 10 so as to face upward. The adjustment screw 31a is screwed into the adjustment internally threaded hole 21b in the unit chassis 21. The adjustment screw 31b is screwed into the adjustment internally threaded hole 21c. A compression coil spring 32a is provided around the outer periphery of the adjustment screw 31a. A compression coil spring 32b is provided around the outer periphery of the adjustment screw 31b. The compression coil springs 32a and 32b are interposed between the unit chassis 21 and the movable base 10 in a compressed state.

As shown in FIG. 1, a supporting member 22 is secured to the unit chassis 21, and a central portion 23a of a supporting substrate 23 is secured to a back portion of the supporting member 22. Base portions of resilient wires 24 are secured to the supporting substrate 23. A total of four resilient wires 24 are formed, two at the left end and the other two at the right end of the supporting substrate 23. The four resilient wires 24 form resilient supporting members. The resilient wires 24 pass through corresponding openings 22a in the supporting member 22 and extend parallel to each other in a tangential direction (Tan) of the optical disk D.

Figure 2:
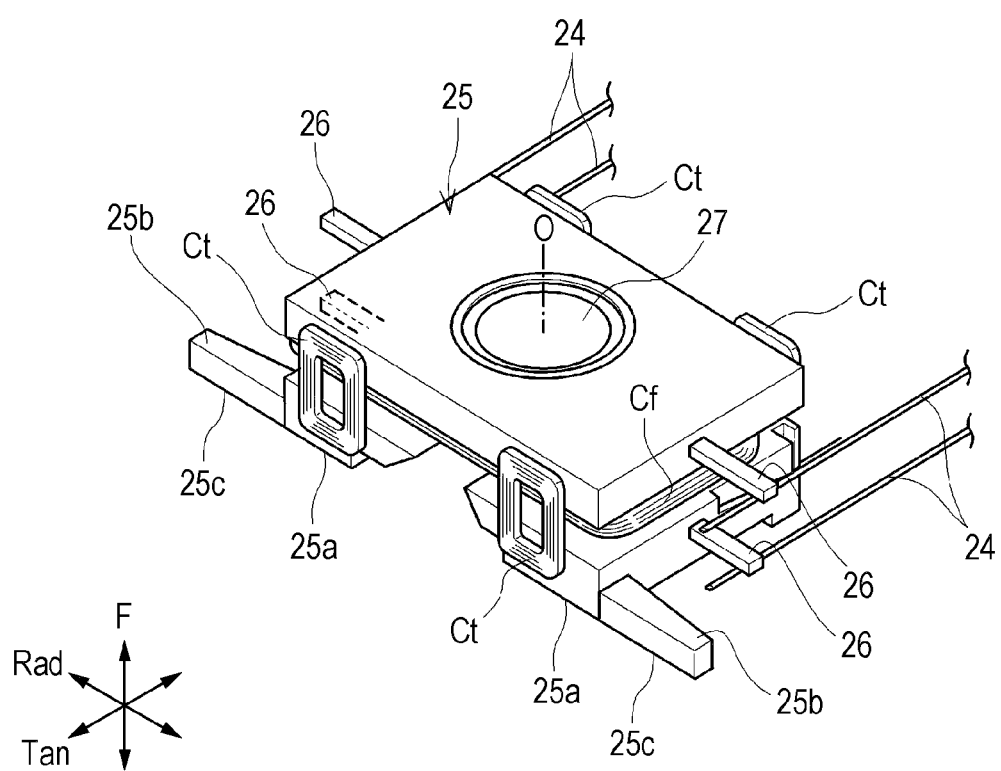
FIG. 2 is a partial perspective view of a structure of a lens holder that is supported by resilient supporting members.

The lens driving unit 20 includes a lens holder 25. The lens holder 25 is formed of synthetic resin or lightweight metal. The lens holder 25 holds an objective lens 27. As shown in FIG. 2, of portions of a lower surface of the lens holder 25, the portion that opposes the stopper portions 13a at the upper side of the movable base 10 are restricting abutting portions 25a. Two protrusions 25b extending towards two sides in the radial direction (Rad) are formed integrally with a lower portion of the lens holder 25. Lower surfaces of the protrusions 25b are opposing abutting portions 25c. At an upper surface of a bottom portion of the unit chassis 21, portions thereof that oppose the opposing abutting portions 25c are receiving portions 21d.

As shown in FIGS. 1 and 2, metallic supporting terminals 26 extending towards two sides in the radial direction (Rad) are provided at the lens holder 25. The metallic supporting terminals 26 are mounted and secured in the lens holder 25. A focus coil Cf is wound around the lens holder 25. Tracking coils Ct are provided at two side surfaces of the lens holder 25 oriented in the two tangential directions (Tan), two at one side surface and the other two at the other side surface of the lens holder 25. A terminal portion of a coil winding of the focus coil Cf is wound around and secured to two of the four metallic supporting terminals 26. The four tracking coils Ct are connected in series. Terminal portions of coil windings of the tracking coils Ct are wound around and secured to two of the four metallic supporting terminals 26.

End portions of the resilient wires 24 are soldered and secured to the respective metallic supporting terminals 26. The lens holder 25 is supported so as to be movable in the radial direction (Rad) and optical-axis direction (F) by the four resilient wires 24 that extend in a direction orthogonal to the direction of an optical axis O. The resilient wires 24 are formed of conductive metal. Due to the soldering, the terminal of the coil winding of the focus coil Cf is brought into conduction with two resilient wires 24, and the terminals of the coil windings of the tracking coils Ct are brought into conduction with the other two resilient wires 24. From a drive circuit (not shown), correction drive current is supplied to the focus coil Cf via the corresponding resilient wires 24 and to the tracking coils Ct via the corresponding resilient wires 24.

As shown in FIG. 1, a pair of yokes 21e and 21e of the unit chassis 21 are bent in an integrated manner with the unit chassis 21. Magnets M are secured to the yokes 21e and 21e, respectively. The magnets M oppose both the focus coil Cf and the tracking coils Ct, which are mounted on the lens holder 25.

The focus coil Cf and the magnets M form a focus correcting mechanism. In the focus correcting mechanism, the correction drive current that flows in a radial direction (Rad) through the focus coil Cf and the magnetic fields from the magnets M causes the lens holder 25 to be driven in an optical-axis direction (F).

The tracking coils Ct and the magnets M form a tracking correcting mechanism. In the tracking correcting mechanism, the correction drive current that flows in an optical-axis direction through the tracking coils Ct and the magnetic fields from the magnets M causes the lens holder 25 to be driven in a radial direction (Rad).

The optical pickup device 1 is assembled as follows.

In assembling the lens driving unit 20, the supporting member 22 is secured to the unit chassis 21, and the supporting substrate 23 to which the base portions of the four resilient wires 24 are secured is secured to the supporting member 22. At this time, the four resilient wires 24 pass through the corresponding openings 22a of the supporting member 22 and extend in the tangential direction.

The unit chassis 21 is temporarily secured to a holding jig at a die. Using a positioning jig, the lens holder 25 is positioned on the unit chassis 21. When the position of the lens holder 25 on the unit chassis 21 is determined, the positions of the four resilient wires 24 are determined such that a slight gap exists between the resilient wires 24 and the metallic supporting terminals 26. When the position of the lens holder 25 is determined, the metallic supporting terminals 26 and the respective resilient wires 24 are soldered to each other. Thereafter, the objective lens 27 is placed on the lens holder 25. In FIG. 3, each hardened solder is represented by reference numeral 28. In this assembly work, after the position of the lens holder 25 at the unit chassis 21 is precisely determined, the metallic supporting terminals 26 and the resilient wires 24 are soldered to each other. Therefore, it is possible to position an optical axis O of the objective lens 27 with respect to the unit chassis 21 with high precision.

The lens driving unit 20 that has been assembled in this way is mounted on the movable base 10 by the tilt adjusting mechanism 30. That is, the support reference portion 21a of the unit chassis 21 is supported at a location between the fulcrum supporting portion 16 of the movable base 10 and the leaf spring 31, and the adjustment screws 31a and 31b that have been inserted into two locations of the movable base 10 are screwed into the respective adjustment internally threaded holes 21b and 21c in the unit chassis 21. The compression coil springs 32a and 32b are mounted at locations between the unit chassis 21 and the movable base 10.

When the optical pickup device 1 is mounted on the optical disk device, as shown in FIG. 1, the movable base 10 is supported by the guide shaft 2 and the drive screw shaft 3.

Thereafter, a reference disk is set on the turntable of the optical disk device, and the tilt of the optical axis O of the optical pickup device 1 is adjusted. In the adjusting operation, with an abutting portion where the fulcrum supporting portion 16 and the support reference portion 21a contact each other serving as a fulcrum, the unit chassis 21 is tilted around a Rad axis by adjusting the tightening amount of the adjustment screw 31a. In addition, with the abutting portion where the fulcrum supporting portion 16 and the support reference portion 21a contact each other serving as a fulcrum, the unit chassis 21 is tilted around a Tan axis by adjusting the tightening amount of the adjustment screw 31b. By these adjustments, the opposing angle between the reference disk and the optical axis O of the lens driving unit 20 is adjusted.

As shown in FIG. 3, the stopper protrusions 13 at the bottom portion of the movable base 10 are inserted into the corresponding openings 21f formed in the unit chassis 21, so that the stopper portions 13a at the upper ends of the stopper portions 13 protrude above the receiving portions 21d of the unit chassis 21.

FIG. 3 illustrates a state in which the lens holder 25 is resiliently supported at a neutral position by the resilient wires 24 when an external force does not act upon the lens holder 25. At this time, the restricting abutting portions 25a at the bottom portion of the lens holder 25 and the stopper portions 13a of the movable base 10 are separated from each other by a distance H1 in the optical-axis direction (F direction). The opposing abutting portions 25c of the lens holder 25 and the receiving portions 21d of the unit chassis 21 are separated from each other by a distance H2. The distance H2 is larger than the distance H1.

Next, the operation of the optical pickup device 1 is described.

When an optical disk is placed on the turntable of the optical disk device, the turntable rotates and, thus, the optical disk rotates. First, the focus correcting mechanism causes the lens holder 25 to move downward by approximately 1 mm in a direction away from the optical disk (that is, a downward direction in FIG. 1). When the light emitting element emits detection light, which is laser light, the detection light is reflected by a prism 15 and is caused to converge towards the optical disk by the objective lens 27. When the detection light is focused on a recording surface of the optical disk, reflected light thereof returns along the optical axis O of the objective lens 27 and this returning light is detected by the light receiving element. By monitoring whether or not the reflected light is detectable while raising the lens holder 25 by the focus correcting mechanism, for example, a determination is made as to whether or not an optical disk is placed on the turntable, or the type of optical disk, such as a CD or a DVD, is determined.

When it is detected that an optical disk is placed on the turntable and the type of optical disk is determined, the optical disk is rotationally driven and, for example, image data is read. At this time, the focus correcting mechanism performs a focus correction operation in which the lens holder 25 is slightly driven in a direction F to constantly focus the detection light on the recording surface of the optical disk. The tracking correcting mechanism performs a tracking correction operation in which the lens holder 25 is slightly driven in a radial direction (Rad), and a spot where the detection light is focused follows a recording track of the optical disk.

As described above, the lens holder 25 is driven in an optical-axis direction (F) by the focus driving mechanism. During the operation, the lens holder 25 may be moved downward by an amount that is more than necessary due to an erroneous focus correction operation. In addition, the lens holder 25 may also be moved downward by an amount that is more than necessary when the lens holder 25 is subjected to a large downward acceleration.

Figure 4:
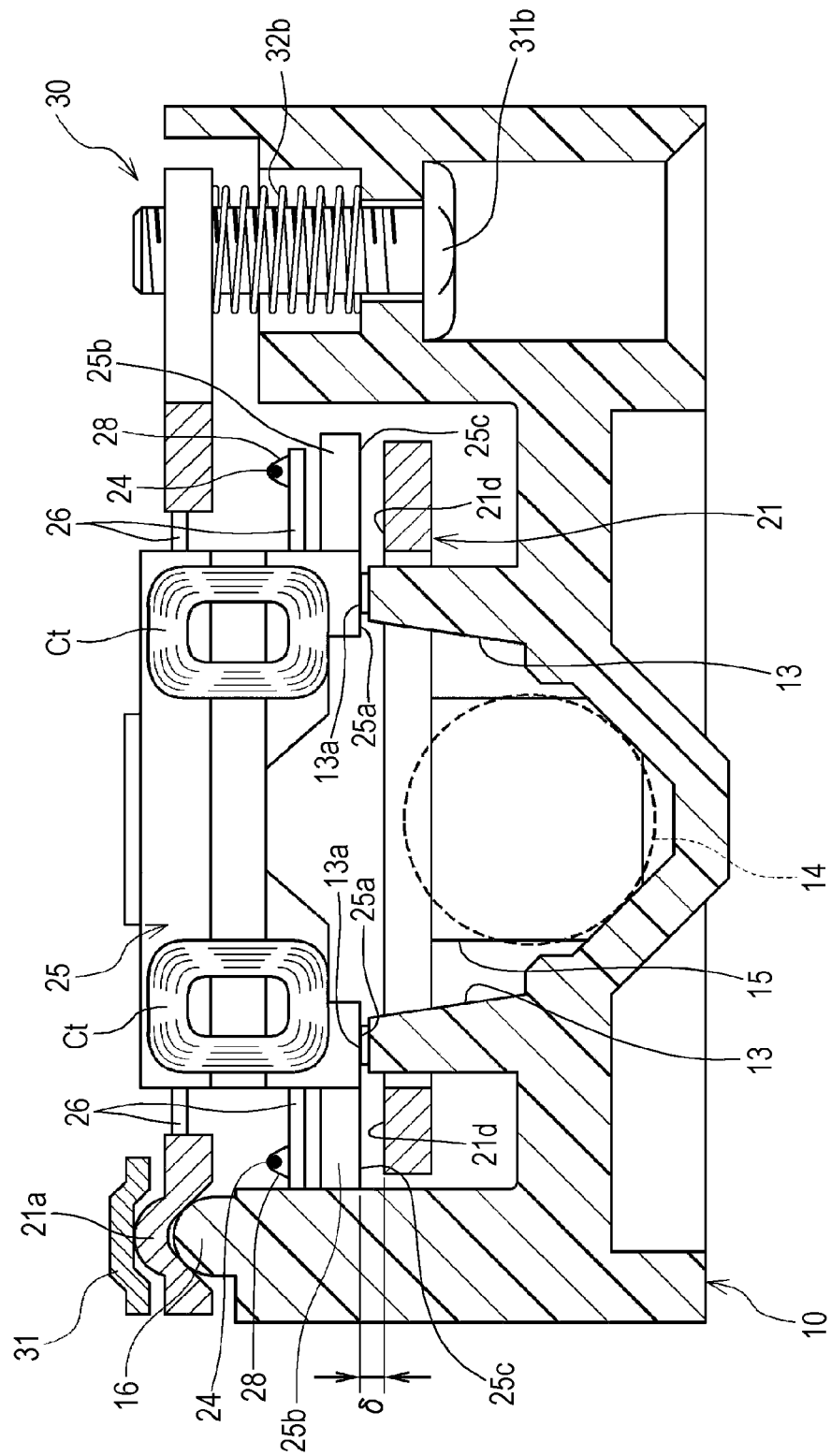
FIG. 4 is a sectional view of the optical pickup device along the line III-III and illustrates a state in which the lens holder has moved downward.

At this time, as shown in FIG. 4, the restricting abutting portions 25a at the bottom portion of the lens holder 25 come into contact with the stopper portions 13a at the upper ends of the stopper protrusions 13 that are provided at the movable base 10, so that further downward movement of the lens holder 25 is restricted. Therefore, it is possible to prevent the resilient wires 24 from becoming excessively bent, so that it is possible to prevent the resilient wires 24 from undergoing plastic deformation and metal fatigue.

In FIG. 3, the distance H1 between each restricting abutting portion 25a and its corresponding stopper portion 13a is shorter than the distance H2 between each opposing abutting portion 25c and its corresponding receiving portion 21d. Therefore, when the lens holder 25 moves downward, each opposing abutting portion 25c of the lens holder 25 also moves closer to its corresponding receiving portion 21d of the unit chassis 21; and, as shown in FIG. 4, when each restricting abutting portion 25a and its corresponding stopper portion 13a come into contact with each other, the opposing abutting portions 25c and the receiving portions 21d are kept separated by a distance δ. δ=H2−H1.

As shown in FIG. 4, even if the lens holder 25 is moved maximally downward in a direction away from the optical disk, the lens holder 25 is always separated from the unit chassis 21 without contacting the unit chassis 21. As mentioned above, in assembling the lens driving unit 20, after mounting the supporting member 22, the supporting substrate 23, and the resilient wires 24 at the unit chassis 21, the lens holder 25 is positioned and the resilient wires 24 and the metallic supporting terminals 26 are soldered to each other. During the soldering, flux may adhere to, for example, the receiving portions 21d of the unit chassis 21. When the flux adhered to the unit chassis 21 is used in a high-temperature environment, the flux exhibits adhesiveness and may temporarily adhere to and hold the lens holder 25 that has moved downward.

However, as shown in FIG. 4, even if the lens holder 25 moves downward by a maximum distance, the lens holder 25 is kept separated from the unit chassis 21. Therefore, even in a high-temperature environment, the lens holder 25 does not adhere to the unit chassis. Consequently, it is possible to smoothly move the lens holder 25 upward and downward in the optical-axis direction (the direction F) and to reduce the possibility of occurrences of error in detecting the presence or absence of the optical disk and in detecting the type of optical disk.

Next, as shown in FIG. 1, when the lens driving unit 20, where the lens holder 25 is mounted on the unit chassis 20, is stored and transported before being mounted on the movable base 10, external force may accidentally be applied to the lens holder 25. However, even if this force moves the lens holder 25 downward, since the opposing abutting portions 25c do not contact the corresponding receiving portions 21d of the unit chassis 21, it is possible to prevent the resilient wires 24 from becoming excessively bent. In addition, even if flux adheres to the receiving portions 21d, the lens holder 25 does not adhere to the receiving portions 21d even if the environment is a high-temperature environment.

In the embodiment according to the present invention, as shown in FIG. 3, when the lens holder 25 is in the neutral position, the distance H1 between each restricting abutting portion 25a and its corresponding stopper portion 13a is shorter than the distance H2 between each opposing abutting portion 25c and its corresponding receiving portion 21d. Therefore, when the optical pickup device 1 is operating, even if the lens holder 25 moves downward, the lens holder 25 does not come into contact with the unit chassis 21. Consequently, even if flux adheres to the receiving portions 21d of the unit chassis 21, the lens holder 25 does not adhere to the unit chassis 21 in a high-temperature environment. However, when the lens driving unit 20 is controlled as a single unit, since the opposing abutting portions 25c of the lens holder 25 oppose the unit chassis 21, excessive bending of the resilient wires 24 caused when the opposing abutting portions 25c come into contact with the unit chassis 21 as a result of a downward force being accidentally applied to the lens holder 25 can be prevented.

In order to cause the resilient wires 24 to function in an optimal state at all times, the distance H2 between each opposing abutting portion 25c and its corresponding receiving portion 21d shown in FIG. 3 needs to be within a range in which the bending deformation amount of the resilient wires 24 when the lens holder 25 has been moved downward to this position at the distance H2 does not exceed a resilience region, that is, a yield point. However, if safety is considered, it is desirable that, when the lens holder 25 is moved by the distance H2, the distance H2 is set such that the bending deformation stress of the resilient wires 24 is less than or equal to ⅓ of the yield point.

In the embodiment shown in FIGS. 3 and 4, although the stopper protrusions 13 protrude upward from the movable base 10 and end portions of the stopper protrusions 13 are the stopper portions 13a, it is possible for the stopper portions 13a to be provided at the flat bottom portion of the movable base 10 and for the restricting abutting portions 25a to protrude downward from the lens holder 25.

In addition, it is possible to provide the unit chassis 21 with a suppressing portion that suppresses excessive upward movement (that is, excessive movement towards the optical disk) of the lens holder 25.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An optical pickup device comprising:
a movable base; and
a lens driving unit that is supported by the movable base,
wherein the lens driving unit includes a unit chassis, a lens holder, a resilient supporting member, and a focus correcting mechanism;
the lens holder, the resilient supporting member, and the focus correcting mechanism being provided at the unit chassis;
the lens holder holding an objective lens that opposes a recording medium; the resilient supporting member supporting the lens holder;
the focus correcting mechanism moving the lens holder in a direction of an optical axis of the objective lens,
wherein the lens holder includes a restricting abutting portion and an opposing abutting portion,
wherein, when the lens holder moves in a direction away from the recording medium, the restricting abutting portion comes into contact with the movable base to restrict further movement of the lens holder, and
wherein, when the lens holder moves in the direction away from the recording medium, the opposing abutting portion moves closer to the unit chassis, and, when the restricting abutting portion comes into contact with the movable base, the opposing abutting portion opposes the unit chassis with a gap between the opposing abutting portion and the unit chassis.

2. The optical pickup device according to claim 1, wherein a positional relationship between the opposing abutting portion and the unit chassis is determined such that, when the opposing abutting portion and the unit chassis come into contact with each other in a state in which the lens driving unit is not mounted on the movable base, an amount of deformation of the resilient supporting member is within a resilience region of the resilient supporting member.

3. The optical pickup device according to claim 1, wherein a plurality of resilient supporting members are provided, the plurality of resilient supporting members being a plurality of resilient wires that extend in a direction that crosses the direction of the optical axis,
wherein a base portion of each resilient wire is secured at the unit chassis, and
wherein an end portion of each resilient wire and the lens holder are soldered and secured to each other.

4. The optical pickup device according to claim 3, wherein, in a state in which the base portion of each resilient wire is secured at the unit chassis, the lens holder is positioned at the unit chassis, and the end portion of each resilient wire and the lens holder are soldered to each other.

5. The optical pickup device according to claim 1, wherein the movable base includes a stopper protrusion that comes into contact with the restricting abutting portion,
wherein the unit chassis includes a receiving portion that opposes the opposing abutting portion, and
wherein an end portion of the stopper protrusion is positioned closer to the lens holder than the receiving portion.

6. The optical pickup device according to claim 1, further comprising a tilt adjusting mechanism that is disposed between the movable base and the unit chassis, the tilt adjusting mechanism adjusting an amount of tilt of the optical axis of the objective lens.

7. An optical pickup device comprising:
a movable base; and
a lens driving unit that is supported by the movable base,
wherein the lens driving unit includes a unit chassis, a lens holder, a plurality of resilient supporting members, and a focus correcting mechanism;
the lens holder, the resilient supporting members, and the focus correcting mechanism being provided at the unit chassis;
the lens holder holding an objective lens that opposes a recording medium;
the resilient supporting members supporting the lens holder;
the focus correcting mechanism moving the lens holder in a direction of an optical axis of the objective lens,
wherein the lens holder includes a restricting abutting portion and an opposing abutting portion,
wherein, when the lens holder moves in a direction away from the recording medium, the restricting abutting portion comes into contact with the movable base to restrict further movement of the lens holder, and
wherein, when the lens holder moves in the direction away from the recording medium, the opposing abutting portion moves closer to the unit chassis, and, when the restricting abutting portion comes into contact with the movable base, the opposing abutting portion opposes the unit chassis with a gap between the opposing abutting portion and the unit chassis.

8. The optical pickup device according to claim 7, wherein a positional relationship between the opposing abutting portion and the unit chassis is determined such that, when the opposing abutting portion and the unit chassis come into contact with each other in a state in which the lens driving unit is not mounted on the movable base, an amount of deformation of the resilient supporting member is within a resilience region of the resilient supporting members.

9. The optical pickup device according to claim 7, wherein the plurality of resilient supporting members are a plurality of resilient wires that extend in a direction that crosses the direction of the optical axis, wherein a base portion of each resilient wire is secured at the unit chassis, and wherein an end portion of each resilient wire and the lens holder are soldered and secured to each other.

10. The optical pickup device according to claim 9, wherein, in a state in which the base portion of each resilient wire is secured at the unit chassis, the lens holder is positioned at the unit chassis, and the end portion of each resilient wire and the lens holder are soldered to each other.

11. The optical pickup device according to claim 7, wherein the movable base includes a stopper protrusion that comes into contact with the restricting abutting portion, wherein the unit chassis includes a receiving portion that opposes the opposing abutting portion, and wherein an end portion of the stopper protrusion is positioned closer to the lens holder than the receiving portion.

12. The optical pickup device according to claim 7, further comprising a tilt adjusting mechanism that is disposed between the movable base and the unit chassis, the tilt adjusting mechanism adjusting an amount of tilt of the optical axis of the objective lens.

13. An optical pickup device comprising:

a movable base; and a lens driving unit that is supported by the movable base, wherein the lens driving unit includes a unit chassis, a lens holder, a resilient supporting member, and a focus correcting mechanism;

the lens holder, the resilient supporting member, and the focus correcting mechanism being provided at the unit chassis;

the lens holder holding an objective lens that opposes a recording medium;

the resilient supporting member supporting the lens holder;

the focus correcting mechanism moving the lens holder in a direction of an optical axis of the objective lens, wherein a tilt adjusting mechanism is disposed between the movable base and the unit chassis, the tilt adjusting mechanism adjusting an amount of tilt of the optical axis of the objective lens, wherein the lens holder includes a restricting abutting portion and an opposing abutting portion, wherein, when the lens holder moves in a direction away from the recording medium, the restricting abutting portion comes into contact with the movable base to restrict further movement of the lens holder, wherein, when the lens holder moves in the direction away from the recording medium, the opposing abutting portion moves closer to the unit chassis, and, when the restricting abutting portion comes into contact with the movable base, the opposing abutting portion opposes the unit chassis with a gap between the opposing abutting portion and the unit chassis, and wherein a positional relationship between the opposing abutting portion and the unit chassis is determined such that, when the opposing abutting portion and the unit chassis come into contact with each other in a state in which the lens driving unit is not mounted on the movable base, an amount of deformation of the resilient supporting member is within a resilience region of the resilient supporting member.

14. The optical pickup device according to claim 13, wherein a plurality of resilient supporting members are provided, the plurality of resilient supporting members being a plurality of resilient wires that extend in a direction that crosses the direction of the optical axis, wherein a base portion of each resilient wire is secured at the unit chassis, and wherein an end portion of each resilient wire and the lens holder are soldered and secured to each other.

15. The optical pickup device according to claim 14, wherein, in a state in which the base portion of each resilient wire is secured at the unit chassis, the lens holder is positioned at the unit chassis, and the end portion of each resilient wire and the lens holder are soldered to each other.

16. The optical pickup device according to claim 13, wherein the movable base includes a stopper protrusion that comes into contact with the restricting abutting portion, wherein the unit chassis includes a receiving portion that opposes the opposing abutting portion, and wherein an end portion of the stopper protrusion is positioned closer to the lens holder than the receiving portion.

* * * * *